July 17, 1951          J. R. HUBER          2,560,695
APPARATUS FOR SECURING CARGO IN TRANSIT
Filed March 7, 1949          3 Sheets-Sheet 2
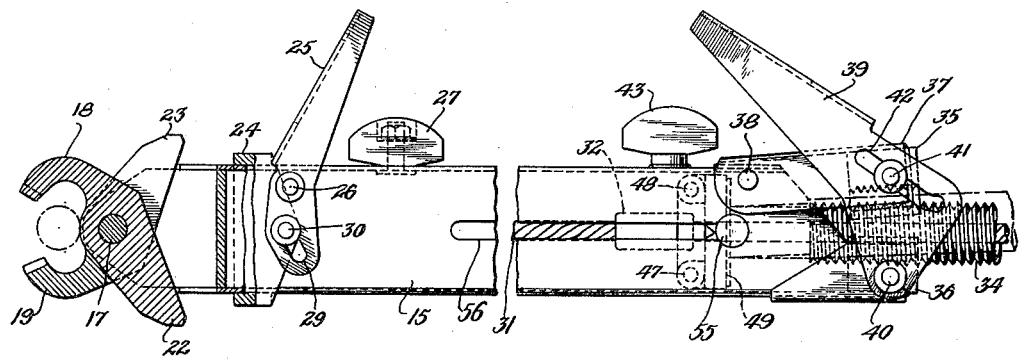
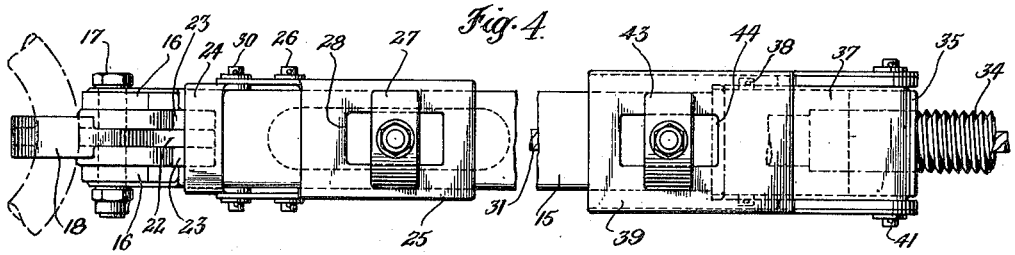
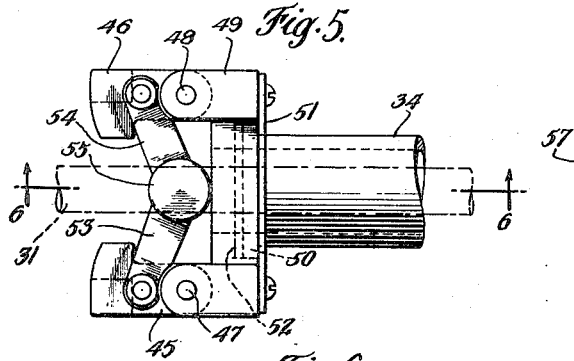
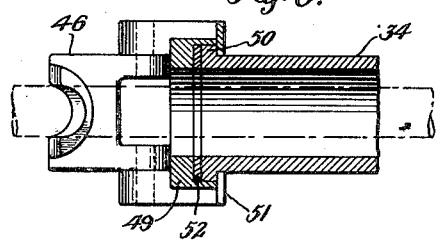
INVENTOR
J. Richard Huber
BY Harris S. Campbell
ATTORNEY July 17, 1951
J. R. HUBER
2,560,695
APPARATUS FOR SECURING CARGO IN TRANSIT
Filed March 7, 1949
3 Sheets-Sheet 3
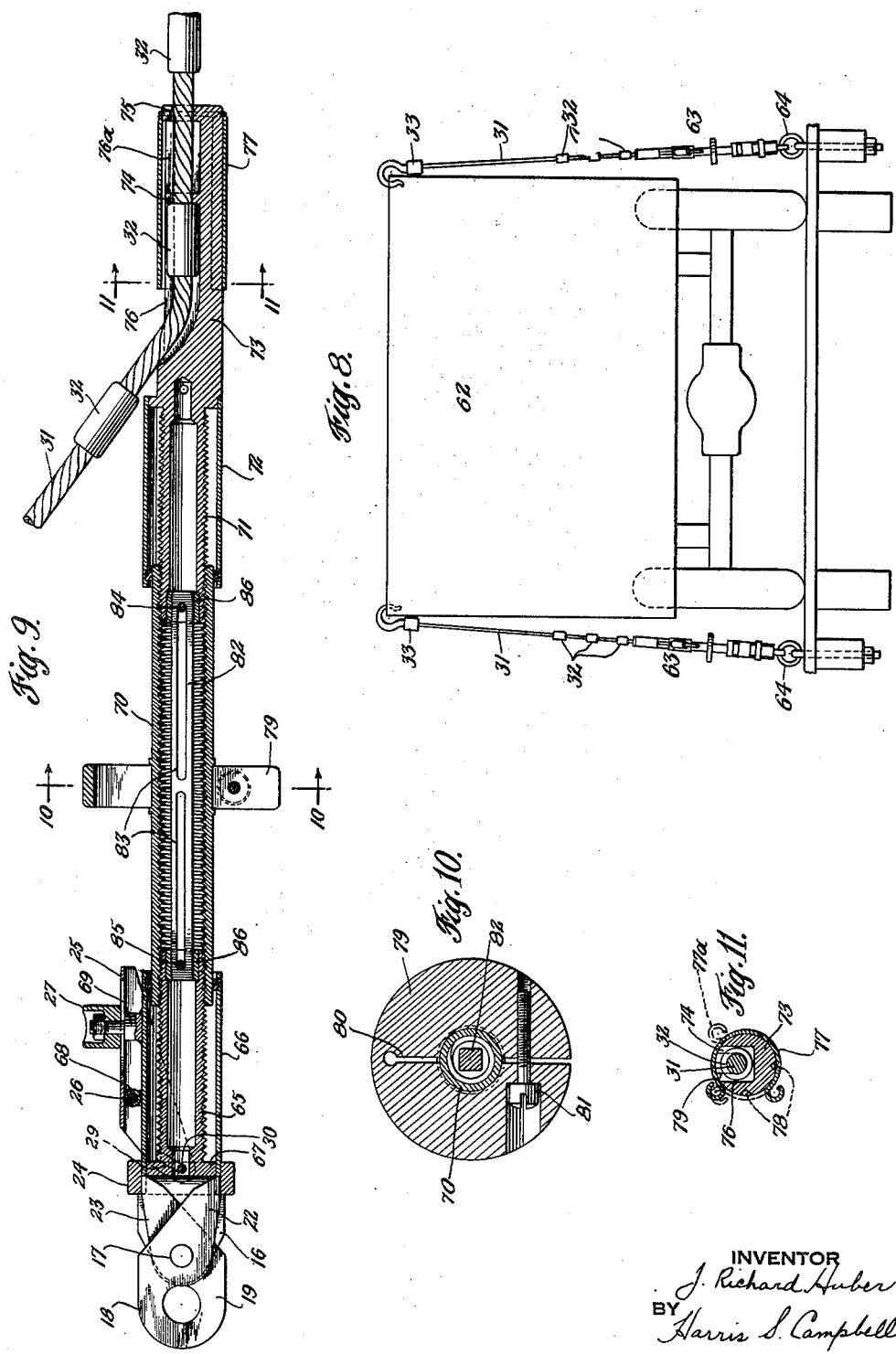
INVENTOR
J. Richard Huber
BY
Harris S. Campbell
ATTORNEY Patented July 17, 1951

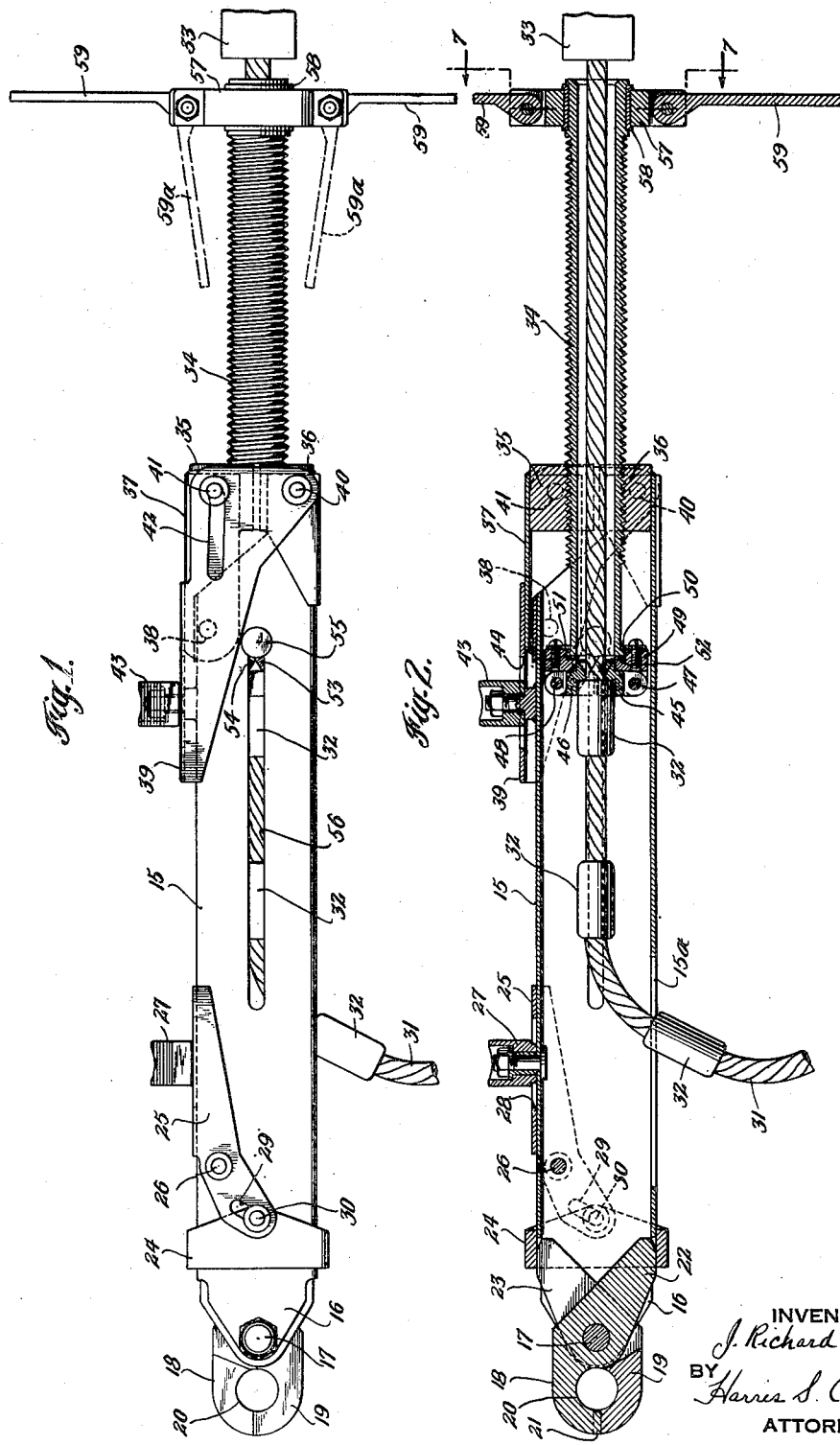

2,560,695

UNITED STATES PATENT OFFICE 2,560,695

APPARATUS FOR SECURING CARGO IN TRANSIT

John Richard Huber, Warrington, Pa., assignor to Eastern Rotorcraft Corporation, Neshaminy, Pa., a corporation of Pennsylvania Application March 7, 1949, Serial No. 80,021

16 Claims. (Cl. 248—361)

This invention relates to devices suitable for securing heavy articles or equipment in fixed position while they are being transported in a carrier vehicle.

The apparatus of the present invention is suitable for use with carriers of different types which may be used for the shipment of heavy machinery or the like, either by land, water, or air. Regardless of the means of transportation roughness of motion of different kinds including accelerations due to starting and stopping of the carrier vehicle tend to cause shifting of the load from its position unless it is securely fastened to prevent this. Such securing of the equipment being transported is desirable whether the carrier is a truck or trailer, a rail car, a marine vessel, or an aircraft. The problem is particularly acute in connection with the shipment of equipment by airplane due to the fact that accelerations of considerable magnitude may be encountered in the vertical direction as well as in horizontal directions. Such vertical accelerations may occur during flight through rough air or during flight maneuvers. Thus, it is necessary to retain the equipment being shipped against lifting off the floor of the aircraft as well as shifting position.

Many different methods have been used to fasten articles in position during shipment. Most of these involve crude equipment such as ropes or metal straps which are passed over the equipment and tied to anchor rings or other suitable fastening points. In transporting heavy equipment by freight car sometimes metal straps are used for securing the load, the ends of the strap being passed around an anchor point and twisted by suitable tools to provide an end fastening. Such an arrangement usually permits the strap to be used only once, thus involving the discarding of expensive material because the ends are distorted.

Particularly in connection with air transportation it is desirable to provide fastening means which is not only relatively light in weight but may be quickly applied and adjusted so that a minimum amount of time is lost during loading and unloading operations. This time element is particularly important in connection with air shipments since this mode of transportation is used chiefly as a time saving medium. However, reduction in loading and unloading time is also of importance in other means of transportation since a direct labor cost is involved. The time required for loading and unloading may be reduced materially by the use of suitable tie-down equipment.

It is an object of the present invention to provide improved retention equipment which is suitable for use in securing a variety of articles during shipment such as trucks, tractors, mining equipment, crated or boxed articles, etc. The securing apparatus of the present invention is readily adjustable to provide for any required length and is adaptable for use in a wide variety of situations.

Another object of the present invention is to provide a cargo tie-down device which includes a flexible tension member which is not only adaptable for securing many different types of articles but will transfer a large load efficiently. A flexible cable provides a desirable tension medium, particularly where a good strength-weight ratio is desired. In order to transfer the load effectively from a tension cable, ferrules are swaged on the cable to provide a shoulder against which a reaction may be taken for transferring the load to an anchor device. This form of transfer is capable of developing the full strength of the cable without damage to the cable itself.

A further object of the invention is the provision of a compact, light-weight and rugged anchor unit which is used to fasten the cable unit to an anchor point in the floor or other suitable structure in a fashion which permits readily taking up the slack in the cable and provides for quickly inducing predetermined tension load. The anchor unit is constructed in a fashion to cooperate with the cable and its multiple ferrules so that the cable may be connected by its end fitting to the load and to the anchor unit by the particular ferrule which gives a minimum of slack. The final tensioning of the cable is then obtained through the operation of the anchor unit.

Another object of the invention is the provision of quick-release mechanism at one end of the anchor unit, the construction of which is simple, quick-acting and develops a minimum of strain on the connecting parts. The quick-release mechanism includes operating linkage and locking arrangement which provides for reliable operation with a minimum of care on the part of the operator.

A further object of the invention is the provision of a simple slack take-up mechanism which may be adjusted in a minimum length of time and which also includes a tensioning mechanism incorporating an automatic device which limits the initial tension in the tension member to a predetermined amount.

How the foregoing and other objects and advantages of the invention are attained will be clear from the following description of the drawings, in which—

Figure 1 is a side elevational view of a tie-down unit according to the present invention.

Figure 2 is a longitudinal sectional view through the tie-down unit illustrated in Figure 1.

Figure 3 is a side elevational view of the operational portions of the mechanism similar to Figure 1 but having parts of the mechanism moved to inoperative or adjusting position.

Figure 4 is a plan view of the mechanism of Figure 3 with the parts shown in locked operating position.

Figure 5 is an enlarged view of the load-transferring linkage showing the jaws in open position.

Figure 6 is a sectional view of the linkage mounting taken on the line 6—6, Figure 5.

Figure 7 is a sectional view to an enlarged scale taken on the line 7—7, Figure 2, through the manual tensioning mechanism.

Figure 8 is a somewhat diagrammatic view illustrating the method of applying the mechanism in securing equipment during shipment.

Figure 9 is a longitudinal sectional view of an alternative form of tie-down mechanism.

Figure 10 is a sectional view taken in the direction of arrows 10—10, Figure 9, showing the construction of the manual tensioning mechanism.

Figure 11 is a sectional view taken in the direction of arrows 11—11, Figure 9.

In Figures 1 and 2 the mechanism of the tie-down device is shown in operative condition. The main body of the apparatus is indicated by numeral 15 and consists of a shell having at one end a toggle mechanism for attachment to the anchor point and at the other end a screw-thread device for adjustment of the tension member of the tie-down device. The toggle mechanism is attached to the body 15 by means of projecting ears 16 through which a pivot 17 extends and pivotally supports the releasable jaws 18 and 19. These jaws 18 and 19 are generally similar and are shaped to fit snugly together so that in closed position they provide a circular opening 20 which is used to engage a suitable anchor rod or ring. The outer ends of the jaws 18 and 19 overlap slightly as indicated at 21, thereby making a positive joint with no slot between which might permit jamming or provide an opportunity for loosening action. The jaws 18 and 19 are provided with extension legs 22 and 23 which are proportioned to fit inside the sliding ring or sleeve 24 when the jaws are in closed operating position. Jaw 18 has a single leg 22 attached while jaw 19 is equipped with double legs 23 between which leg 22 passes to give concentric support to the toggles. The ring 24 is held securely in this position by means of the control lever 25 which is pivoted to the body 15 by pivot 26 and may be securely locked in the jaw closed position by means of the button or latch 27. As will be clear by reference to Figures 3 and 4, the latch 27 is relatively large for ease of operation and is shaped so that it will pass through the rectangular hole 28 in the lever 25 after which the latch 27 may be turned to cross position as illustrated in Figures 1, 2 and 4 where it prevents the lever 25 from being lifted. The sleeve 24 is moved axially to engage or disengage the extension 22 and 23 of the jaws through the action of the slot and pivot shown at 29 and 30 respectively.

The tension member of the tie-down apparatus as illustrated is in the form of a high-strength flexible cable 31 having ferrules 32 swaged to the cable at regular intervals. The cable 31 is attached to a terminal fitting 33 which may be in the form of a hook, ring or other suitable member for attachment to the load being carried.

While being used to hold cargo the cable 31 extends through tubular member 34 which is provided with an external thread to fit the split-nut mechanism supported on the body 15 at the end opposite to the anchor jaws. The split-nut mechanism is most clearly shown in Figures 2 and 3 and includes two nut parts 35 and 36 which may be spread apart to release the threaded tube 34 and permit it to be moved axially to a new position where the split-nut may be again tightened to engage the threads on 34 for normal screw-thread operation. The nut part 36 is rigidly fixed to the body 15 such as by welding in place. Nut member 35 is attached to a swingable structure 37 which is pivoted at 38 to the body member 15 so that the nut 35 may be swung away from the nut member 36. A lever 39 is pivoted at 40 to the body member 15 and is connected to the nut supporting part 37 by a pivot 41. By reference to Figure 3 it will be seen that when the lever 39 is raised the nut part 35 is moved away from the nut part 36 due to the action of the cam slot 42 in lever 39 operating against the pivot 41. A latch button 43, similar to button 27, is provided to lock the lever 39 in closed position, there being a slot 44 provided in lever 39 to cooperate with button 43 for this purpose.

At the lower end of the threaded tube 34 mechanism for the transfer of the load from the tension member 31 to the adjusting unit is provided. In order to permit turning the adjusting screw member 34 during the initial tensioning operation without causing rotation and twisting of the cable 31, a rotational bearing connection is provided between the cable contacting parts and the adjusting member 34. This mechanism is most clearly illustrated in Figures 2, 5 and 6. In Figure 2 one of the ferrules 32 is shown in engagement with abutment jaws 45 and 46. These jaws are similar and are pivoted at 47 and 48 to a supporting member 49. The member 49 is connected to the tubular member 34 so that it moves axially therewith. For this purpose an annular flange 50 is provided at the end of member 34 and a split retaining ring 51 completes the connection through the medium of attachment screws. A bearing thrust washer 52 is used to reduce the friction between the parts during the initial tensioning.

The cable abutment parts are prevented from rotation with the threaded member 34 by means of toggle links 53 and 54 which are attached to abutment parts 45 and 46 by means of pivots (see Figure 5). The other ends of links 53 and 54 are pivotally attached to the button 55 which projects through a slot 56 in the body 15 of the unit.

Thus, the member 34 may be adjusted to any longitutdinal position with respect to the body 15 and the button 55 may move along with it. At all positions the button prevents rotation of the ferrule abutment assembly.

The individual parts of the abutment mechanism are more clearly illustrated to an enlarged scale in Figures 5 and 6. In these figures, however, the members 45 and 46 are illustrated in open position. This position can be obtained only when the cable is slack at which time the button 55 may be manually moved to open abutment jaws 45 and 46. When in this open position the ferrules 32 will not engage the abutment members 45 and 46 and the cable 31 may be withdrawn from the tie-down unit so that it may be extended to any length needed for use with the next piece of equipment being shipped. It will be noted in Figures 2 and 6 that the abutment jaws 45 and 46 are provided with a depression which securely locates the ferrule 32 in central position for transferring the tie-down loads from the ferrule to the abutment parts and thence into the tie-down adjusting unit. It will be noted that the opening action of the jaws for lengthening of the cable may be accomplished at any position of adjustment of the tubular threaded member 34 with respect to the body 15.

In order to prevent any appreciable shifting of the load during shipment it is desirable to have an initial tension in the cable member. It is also preferable that the amount of this initial tension be controlled so that the value at all tie-down units are approximately the same. In order to accomplish this tensioning, mechanism is provided which automatically slips when the desired tension is attained. This cable tensioning is accomplished by means of a manually operated clamp device having a body portion 57 mounted at the outer end of the tubular threaded member 34. The body member is retained in position by means of a bearing 58 and suitable locating shoulders. Handles 59 are pivotally attached to the body 57 so that when not in use they may be folded down out of the way as indicated in Figure 1 at 59a.

Figure 7 illustrates the construction of the tensioning mechanism to an enlarged scale. Here it will be seen that the body member 57 is made with a slot 60 extending across a major portion of its diameter. The clamping action between the body 57 and the split bearing member 58, which in turn engages the end of the adjusting screw 34, is accomplished by means of a clamping screw 61 which applies its load through the medium of a spring 61a. Adjustment of the clamping screw 61 may be made to provide slipping action of the adjusting collar at a predetermined torque. This torque is set so that with the mechanical advantage of the thread the desired tension is developed in the cable 31 when slippage occurs.

The manner in which the tie-down apparatus is used will be clear by reference to Figure 8, where it will be seen that a vehicle 62 is being transported in a carrier vehicle such as an aircraft. The cable 31 is connected to the equipment by means of the hook 33 and a tie-down apparatus, illustrated generally at 63, is attached to a ring 64 which is securely fastened to the structure of the carrier vehicle. With this application of the tie-down apparatus as an example the operation of the unit illustrated in Figures 1 to 7 will be as follows:

The tensioning mechanism is first connected to the nearest anchor ring 64 by means of the toggle linkage and the lever 25 moved and latched to lock the anchor connection. Sufficient slack to connect to the equipment being shipped at the desired position is provided by moving the abutment mechanism illustrated in Figures 5 and 6 to the open position and pulling the cable out to the desired length. The abutment mechanism is then moved to closed position and the adjusting screw moved to its outer position as illustrated in Figures 1 and 2. This may be done very quickly by releasing lever 39 and moving the threaded member 34 to its extended position and then resetting the nut 35 and 36 and locking the lever 39 in operative position. This method of extending the tube 34 requires much less time than would be required to extend by rotational action. With the parts in this position the hook is then engaged at the desired point on the cargo and the end of the cable 31 extending from the slot 15a in the lower portion of the body 15 (see Figure 2) is grasped and drawn through the apparatus until most of the slack has been taken up. This drawing-through action is readily accomplished since the ferrules 32 may move through the abutment parts in this direction without restriction due to the one-way action of abutment jaws 45 and 46. In order to take out further slack and bring the abutment parts into contact with the closest ferrule the lever 39 is moved to open position to release the nut unit and the rod 34 is drawn back until it reaches a position where the abutment parts are in engagement with a ferrule 32. The nut parts 35 and 36 are then clamped into operative position and the final tensioning accomplished by rotation of the handles 59 until slippage occurs. This usually requires only a few turns since most of the slack has been removed by steps just described. The complete attachment and tightening operation may, therefore, be accomplished quickly and accurately.

For unloading purposes the tie-down apparatus may be quickly released from the ring 64 merely by raising the lever 25 and thus permitting the jaws 18 and 19 to open and disconnect the tie-down apparatus. It is usually desirable to release most of the tension by a turn or two of the tightening handle prior to releasing the quick-disconnect jaws in order to assure that the cable is not under excessive tension when released.

Figure 9 shows an alternative form of tie-down apparatus. The quick-release mechanism at the lower end of the unit is generally similar to that described for the first form of the apparatus and similar parts have been given the same reference numerals. In the form illustrated in Figure 9, the lugs 16 which support the jaws 18 and 19 are machined integral with the threaded shank 65. A cylindrical cover member 66 is attached to the cylindrical section 67 which is formed between the lugs 16 and the threaded portion 65, the lugs 16 being directly connected to the cylindrical part 67. The operating lever 25 is mounted by means of pivot 26 to suitable bosses or bearing supports 68 which are rigidly connected to the housing 66 in any suitable fashion such as welding. The latch 27 is supported in position on the housing member 66 by means of a suitable stud structure 69.

The operation of the quick-release mechanism is the same as that previously described. To release the jaws 18 and 19, the latch button 27 is moved to a position where it can pass through the hole in the lever 25 and permit the lever to be raised, thus causing movement of the collar 24 through the medium of the slot and pin mechanism 29 and 30.

A barrel housing 70 having a female thread to engage the thread on the shank 65 is attached to the anchor jaw assembly. Extending from the opposite end of the barrel 70 is the terminal assembly which connects the tension load-carrying member 31 to the adjusting mechanism. The terminal structure includes a threaded cylindrical member 71, the thread of which is of opposite hand to the thread or anchor part 65. The female thread in barrel 70 is also opposite hand on the end engaging the terminal shank 71 from that engaging the quick-release shank 65, thus providing for movement of the two end parts toward or away from each other depending upon the direction in which the barrel 70 is rotated. A cylindrical cover member 72 is provided to protect the thread of shank 71 and prevent it from being damaged or obstructed by dirt.

In the arrangement shown the cable member 31 with its ferrules 32 transfers the load through the medium of the special terminal portion 73. Terminal 73 is specially slotted and formed to permit engagement with a ferrule 32 so that the tension load in the cable may be transferred to the terminal member 73 by means of shoulders 74 or 75. Two shoulders are provided to reduce the amount of adjustment required to remove the slack. When the slack is removed from the cable if the nearest ferrule will not reach under the shoulder 74 it may be placed in position against the shoulder 75. Thus the adjustment of the barrel for the removal of slack is limited to a maximum distance of about one-half the spacing of the ferrules 32. The construction of the slots and shoulders in the terminal 73 will be more clearly understood by reference to Figure 11. It will be seen by reference to Figures 9 and 11 that the large slot 76 is wide enough to permit entry of the ferrule 32 underneath the shoulder 74. It should be pointed out that the retaining cover 77 may be rotated to dotted outline position 77a so that the slot 76 is uncovered. Depressions 78 in the terminal member 73 are provided to retain a suitable projecting button in the collar 77 so that it will remain in either open or closed position. The ferrule 32 thus may be inserted in position without delay after which the collar 77 may be rotated to closed position to prevent accidental dislodgement of the ferrule in case slackness is introduced into the cable. It will be noted that a smaller slot 79 is provided in the shoulder 74 to allow entry of the cable 31.

A similar construction at shoulder 75 allows insertion of a ferrule 32 into the slot 76a behind the shoulder 75.

For applying the final adjustment and tension a hand wheel 79 is associated with the barrel 70 to facilitate rotation thereof. This hand wheel is clamped to the barrel 70 in a fashion which will be clear from Figure 10. The slot 80 permits deformation of the hand wheel and the screw member 81 may be tightened to the degree desired to give a predetermined slipping torque which controls the initial tension in the cable 31.

In order to prevent rotation of the terminal member 73 with respect to the anchor unit a longitudinal rectangular member 82 extends between the shank 71 of the terminal 73 and the shank 65 of the anchor unit. Member 82 contains slots 83 through which pins 84 and 85 are passed to engage holes in the ends of shanks 71 and 65. Collars 86 are provided to simplify the manufacture. With this construction a rectangular hole is required in only the small separate collars 86 rather than in the end of the shank. Assembly of the pins 84 and 85 may be made through small holes in the barrel 70 (not shown) after which the holes may be closed in any suitable fashion such as by a threaded plug. This construction not only prevents rotation of the terminal 73 during adjustment of the apparatus but also acts to limit the degree of extension of the unit so that the terminal members cannot be completely turned out of the barrel by accident.

In using this unit to lash cargo during shipment the unit is first anchored to an anchor ring or equivalent structure by operation of the jaws 18 and 19. The tension member 31 may then be connected to the cargo and drawn tight by hand so that the nearest ferrule 32 may engage either the shoulder structure 74 or 75 depending upon which location it will reach. With the ferrule in position the ferrule retaining cylinder 77 is moved to closed position and the hand wheel 79 operated to retract the shanks 65 and 71 into the barrel 70, thus removing the final slack and developing an initial tension in the tension member 31. The hand wheel is turned until slippage occurs at which point the predetermined tension is attained. Release of the load may be accomplished by lifting the lower lever 25 and thus permitting the quick-release jaws 18 and 19 to open. The cable may be quickly removed from the tightening mechanism merely by rotating the cylinder 77 to open position.

From the foregoing it will be evident that I have provided an improved form of cargo tie-down mechanism which provides for rapidly securing or releasing a load of any type and at the same time secures the load positively with all slack removed and with a predetermined tension load in the securing members. The quick-release mechanism is not only simple in construction but is provided with fast-acting double safety features which prevent accidental release. The adjusting mechanism provides for a minimum of rotational action in the unit for the removal of slack. This feature is attained in the first form of the invention by the split-nut action which may be quickly moved to a position where only a small amount of manual rotational action is required for removing the remaining slack and applying the tension. In the second form of the invention this reduction in the amount of manual rotation is obtained by the double shoulder construction, thus assuring that only a small amount of slack need be removed by rotation of the barrel. The split collar construction for the mounting of the manual adjustment member provides a simple and accurate means for controlling the initial tension applied to the tension member. The collar adjustment screw permits ready adjustment of slipping action to change the degree of tensioning to any desired amount.

I claim:

1. A tie-down device for securing heavy articles during transportation in a carrier including a unit for attachment to an anchor point, a flexible cable member having a plurality of protuberances attached thereto, a part adapted to be quickly engaged with any one of said protuberances in a positive fashion to transmit a tension load from said cable, adjusting mechanism for removing slack from said cable and applying an initial tension thereto.

2. In a cargo tie-down device the combination of a flexible tension member having a cargo attaching part and load transfer projections associated therewith, an anchor mechanism having an attaching clamp and relatively rotatable tension adjustment members which may be manually operated, said mechanism including a part having a recess incorporating shoulders for engaging one of said load transfer projections.

3. A tie-down device for securing cargo in a carrier including a flexible tension member and an adjusting anchoring unit, said tension member having longitudinally spaced projections, said anchoring unit having a portion which may be anchored to the carrier in a fashion which precludes relative rotation, a part in threaded engagement with said portion and a mechanism adapted to engage one of the projections of said tension member, a connecting structure between said mechanism and said anchorable portion to prevent rotation of said mechanism when said part is rotated for adjustment purposes.

4. A tie-down device for securing cargo having a flexible tension member, an adjusting unit having a part which may be anchored to the carrier in a fashion to resist turning movement, a part having engaging means for connecting to said tension member, a rotating element for adjusting said tension member and a structure engaging said part to prevent its rotation during operation of said rotating element.

5. In a cargo tie-down device the combination of a cargo gripper, an anchor clamp, a flexible cable connected to said gripper, and adjustable connecting means between said cable and said anchor clamp including a member engaging said cable, a threaded shank, a second member carrying said anchor clamp and having a threaded portion engaging said threaded shank, and a hand element for rotating said shank to adjust said connecting means.

6. In a device for tieing cargo in place, the combination of a body member, a releasable anchor clamp carried by said body member at one end thereof, a releasable split nut carried by said body member at the other end thereof, a threaded rod engaging said split nut, a flexible cable, a cargo engaging member carried by said cable at one end thereof, an abutment carried by said threaded rod and engageable with said cable, and handle means for rotating said threaded rod to tighten said cable.

7. In an adjustable device for tieing cargo in place, the combination with an anchor member of a body member, an anchor clamp carried by said body member at one end thereof, a locking device for releasably locking said anchor clamp in engagement with said fixed anchor member, a split nut carried by said body member at the other end thereof, a threaded rod engaging said split nut, a flexible cable, a cargo engaging member carried by said cable at one end thereof, a detractable abutment carried by said threaded rod, spaced knobs secured to said cable engageable with said abutment, handle means for rotating said rod to adjust the tension of said cable, a lever device associated with said split nut to engage and disengage said split nut from said threaded rod, and a manual device associated with said abutment to move the abutment into a detracted position.

8. In an adjustable cargo tie-down device the combination of a cargo attachment member, a quick-release anchor clamp, adjustable tensioning mechanism between said anchor clamp and said cargo member including a flexible cable connected to said attachment member, and a retractable and expansible body unit having said anchor clamp secured to one end thereof and having said cable detachably secured adjacent the other end thereof, together with a hand grip for moving said unit into retracted position to increase the tension of the mechanism and into expanded position to release said tension.

9. A tie-down device for securing cargo during shipment in a carrier vehicle including a flexible tension element for connecting to the cargo, a unit for connecting said tension element to an anchor point, said tension element having a series of spaced projecting shoulders associated therewith, said unit having a portion adapted to engage one of said shoulders for transferring a load from said element to said unit, a rotatable part to which said portion is attached to provide for relative rotation therebetween to cause adjustment of said tension element to remove slack and produce initial tension.

10. Cargo securing apparatus including a flexible element having load transfer abutments associated therewith, an anchoring and adjusting mechanism having a rotatable adjustment part and a second part secured against rotation and adapted to engage one of said abutments and a movable element on said second part to prevent accidental disengagement of a load transfer abutment.

11. Cargo tie-down apparatus including a flexible member having load transfer shoulders associated therewith, an anchoring mechanism having a part adapted to engage said load transfer shoulders, said part incorporating complementary shoulders at two positions spaced apart approximately one-half the spacing of the load transfer shoulders on the flexible member.

12. Cargo tie-down apparatus including a cable having spaced ferrules attached thereto, an anchor unit having a part adapted to receive said ferrules to transfer a load from said cable to said unit, said part including a plurality of sets of ferrule contacting shoulders spaced closer together than the spacing of said ferrules.

13. Cargo securing apparatus including a flexible tension member having load transfer means associated therewith, an anchor unit having a threaded part for attachment to a fixed point, a terminal threaded part for attchment to said tension member, a threaded barrel engaging both of said threaded parts, a link interconnecting said parts to prevent relative rotation between them.

14. Cargo tie-down apparatus including a flexible tension member, an anchor unit incorporating relatively rotatable parts for adjusting the tension member, a hand operated device frictionally attached to one of said parts including adjusting mechanism to provide for slippage of said device with respect to said part at a predetermined torque.

15. A cargo tie-down device including a flexing ible tension member, an anchor unit incorporating relatively rotatable adjusting parts, one of said parts having a generally cylindrical shape and a female thread, another of said parts having a male thread adapted to operate in the cylindrical part, a cylindrical protective sleeve attached to said male threaded part and proportioned to fit outside the cylindrical female threaded part.

16. A tie-down device having a flexible tension member, a tightening unit to which said tension member is attached, said tension member having longitudinally spaced load transfer abutments, said unit having a part for engaging said abutments for transmitting load from said tension member to said unit, said part having a generally cylindrical portion incorporating a recess for engaging one of said abutments, and a retaining element rotationally mounted on said cylindrical portion for movement to a position which obstructs the opening to the recess and prevents accidental disengagement of the tension member from the tightening unit.

JOHN RICHARD HUBER.

REFERENCES CITED

The following references are of record in the file of this patent:

UNITED STATES PATENTS

| Number | Name | Date |
|---|---|---|
| 703,664 | Nilson | July 1, 1902 |
| 898,094 | Clayton | Sept. 8, 1908 |
| 1,264,782 | Erricson | Apr. 30, 1918 |